United States Patent [19]

Sato

[11] Patent Number: 5,799,892
[45] Date of Patent: Sep. 1, 1998

[54] BAITCASTING REEL WITH A LOWERED PROFILE TO FACILITATE PALMING

[75] Inventor: Jun Sato, Sakai, Japan

[73] Assignee: Shimano, Inc., Japan

[21] Appl. No.: 710,155

[22] Filed: Sep. 12, 1996

Related U.S. Application Data

[63] Continuation of Ser. No. 634,220, Apr. 18, 1996, abandoned, which is a continuation of Ser. No. 332,464, Oct. 31, 1994, abandoned, which is a continuation of Ser. No. 52,300, Apr. 26, 1993, abandoned, which is a continuation of Ser. No. 738,148, Jul. 30, 1991, abandoned.

[30] Foreign Application Priority Data

| Aug. 7, 1990 | [JP] | Japan | 2-83879 |
| Nov. 7, 1990 | [JP] | Japan | 2-116795 |

[51] Int. Cl.$^6$ .......................... A01K 89/02; A01K 89/015
[52] U.S. Cl. ........................... 242/288; 242/310; 242/316
[58] Field of Search ........................... 242/310, 316, 242/289, 288, 278–281, 274, 314, 315, 261, 268

[56] References Cited

U.S. PATENT DOCUMENTS

| 2,163,914 | 6/1939 | Pearson | 242/279 X |
| 2,314,032 | 3/1943 | Coxe et al. | 242/310 X |
| 2,537,590 | 1/1951 | Kaufman | 242/314 |
| 2,686,016 | 8/1954 | Kilian | 242/260 X |
| 4,042,186 | 8/1977 | Moosberg | 242/279 |
| 4,593,866 | 6/1986 | Moosberg et al. | 242/288 |
| 4,666,101 | 5/1987 | Atobe | 242/310 X |
| 4,674,699 | 6/1987 | Fukushima et al. | 242/288 X |
| 4,747,560 | 5/1988 | Karlsson | 242/260 |
| 4,775,113 | 10/1988 | Emura | 242/310 |
| 4,821,978 | 4/1989 | Kaneko | 242/310 |
| 4,830,308 | 5/1989 | Puryear | 242/288 |
| 5,292,087 | 3/1994 | Sato | 242/268 |

FOREIGN PATENT DOCUMENTS

| 1 135 137 | 9/1967 | United Kingdom . |
| 1 449 571 | 7/1974 | United Kingdom . |
| 1 199 405 | 7/1987 | United Kingdom . |
| 2 199 221 | 12/1987 | United Kingdom . |

OTHER PUBLICATIONS

RYOBI Fishing Tackle for 1987 Catalog, p. 7.

*Primary Examiner*—Michael Mansen
*Attorney, Agent, or Firm*—Knobbe, Martens, Olson & Bear, LLP

[57] ABSTRACT

A baitcasting reel includes right and left cases constituting a reel body, and a level wind mechanism and a spool disposed between the right and left cases. The reel body has a substantially circular configuration as seen in a direction along an axis of the spool. The axis of the spool is offset from a center of the reel body away from a fishing rod when the reel is attached to the fishing rod. The level wind mechanism is disposed on or adjacent a horizontal plane extending through the center of the reel body.

13 Claims, 9 Drawing Sheets

FIG.15

BAITCASTING REEL WITH A LOWERED PROFILE TO FACILITATE PALMING

This application is a continuation of application Ser. No. 08/634,220, filed Apr. 18, 1996, now abandoned, which is a continuation of application Ser. No. 08/332,646, filed Oct. 31, 1994, now abandoned, which is continuation of application Ser. No. 08/052,300, filed Apr. 26, 1993, now abandoned, which is a continuation of application Ser. No. 07/738,148, filed Jul. 30, 1991, now abandoned.

BACKGROUND OF THE INVENTION

1. Field of the Invention

This invention relates to baitcasting reels, and more particularly to a baitcasting reel having a level wind mechanism and a spool arranged between right and left cases forming a reel body. 2. Description of the Prior Art This type of reel is mounted on an upper surface of a fishing rod through a mounting foot attached to the reel body. For facility of handling at a casting time, the angler holds the reel and rod in his or her left hand (the hand not used for turning the handle) in a way to cover the reel with the palm (hereinafter referred to as palming). With this in view, the baitcasting reel is designed to have a relatively small vertical dimension.

On the other hand, it is desirable for this type of reel to have a change speed system having a high change gear ratio between the handle and spool. It is also necessary to transmit drive to the level wind mechanism. Thus, there is a limit to reduction in the vertical dimension of the reel body. To reduce the vertical dimension without lowering the change gear ratio and while securing a transmission system for the level wind mechanism, the reel body must have increased fore and aft dimension, resulting in a configuration difficult to handle.

SUMMARY OF THE INVENTION

An object of the present invention is to provide an improved baitcasting reel which facilitates palming without causing the above-noted inconvenience.

The above object is fulfilled, according to the present invention, by a baitcasting reel comprising first and second cases constituting a reel body, and a level wind mechanism and a spool disposed between the first and second cases, wherein the reel body has a substantially circular configuration as seen in a direction along an axis of the spool, the axis of the spool being offset from a center of the configuration away from a fishing rod when the reel is attached to the fishing rod in a horizontal posture, and the level wind mechanism being disposed on or adjacent a horizontal plane extending through the center of the configuration of the reel body.

Figure 3:
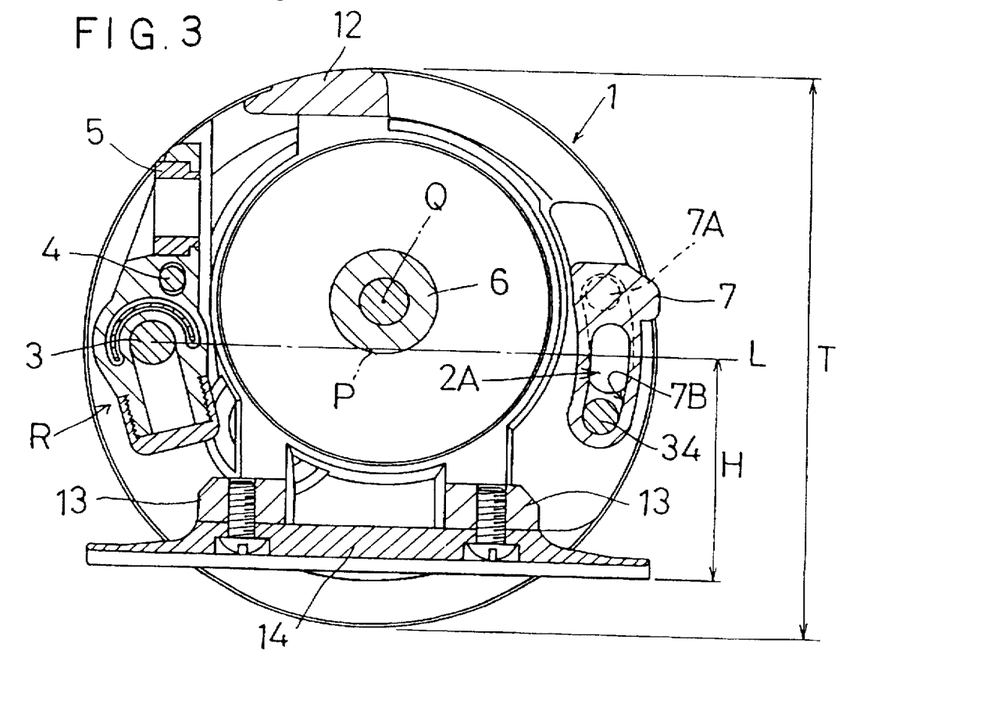
FIG. 3 is a side view in vertical section of the reel.

This baitcasting reel may be constructed as shown in FIG. 3, for example. This construction allows the mounting foot 14 to be displaced upward by an amount of upward displacement of the spool 6 compared with the spool having an axis coinciding with the center P of the configuration of the reel body AO as seen in the direction along the axis Q of the spool. Consequently, the reel upwardly projects a reduced amount when attached to a fishing rod. The spool 6 is displaced upward and the level wind mechanism is disposed on or adjacent the horizontal plane L. Thus, in plan view, the level wind mechanism R may be located at a farthermost position from the spool 6 with no mutual interference.

Since, according to the present invention, the reel body has a substantially circular configuration as seen in a direction along an axis of the spool, the reel upwardly projects a reduced amount from the fishing rod and the level wind mechanism R is disposed in an appropriate position. This is achieved without enlarging the reel body, particularly in the fore and aft direction.

Thus, the present invention provides an improved baitcasting reel which facilitates palming, without lowering the line takeup gear ratio, while allowing the transmission system for the level wind mechanism to be constructed in a fitting way.

Other features and advantages of the present invention will be apparent from the following description of the preferred embodiments.

BRIEF DESCRIPTION OF THE DRAWINGS

The drawings show baitcasting reels according to the present invention, in which.

DETAILED DESCRIPTION OF THE PREFERRED EMBODIMENTS

Baitcasting reels according to the present invention will be described in detail with reference to the drawings.

FIGS. 1 through 9 show a baitcasting reel in one embodiment of the invention. The reel comprises a reel body AO having first and second cases, such as a left case 1 and a right case 2. The reel body AO has a level wind mechanism R mounted in a front position thereof and including a screw shaft 3, a guide rod 4 and a line guide 5. Further, the reel body AO has a spool 6 mounted centrally thereof and a clutch controller 7 mounted in a rear position. The right case 2 supports a handle 8, a drag controller 9, a cast controller 10 and a brake controller 11. The right case 2 may be opened by removing screws 45.

In this reel, parts of the left case 1 and right case 2, and a thumb rest 12 and a pair of lower frames 13 interconnecting the two cases are formed into an integral unit A by aluminum die casting. To form the reel body AO, a lid B acting as part of the right case 2 is attached to the integral unit A. The reel body AO has a circular configuration in side view. The axis Q of the spool 6 is offset a predetermined amount upward from the center P of the circular configuration. The screw shaft 3 is disposed on a horizontal plane L level with the center P.

A mounting foot 14 is disposed between the pair of lower frames 13. The foot 14 has a vertical distance H not exceeding, 40 mm from the center P, with the reel body AO having an outside diameter T within a range of 45 to 70 mm. The reel having such dimensions facilitates palming at a casting time.

Figure 10:
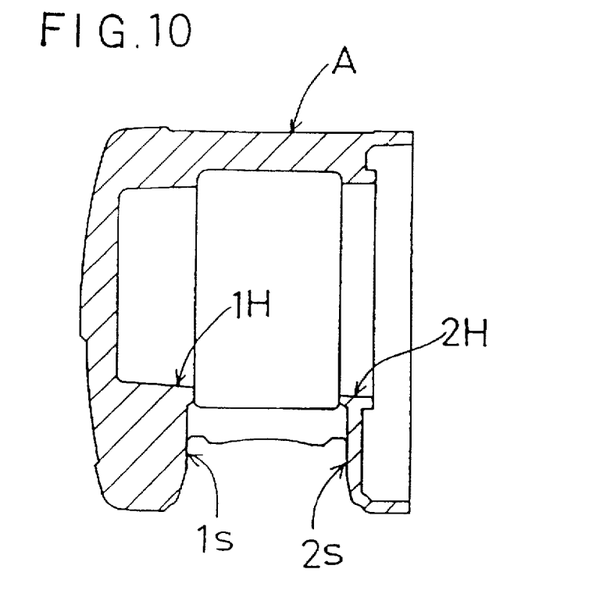
FIG. 10 is a sectional view of the integral unit after a die casting process.
Figure 11:
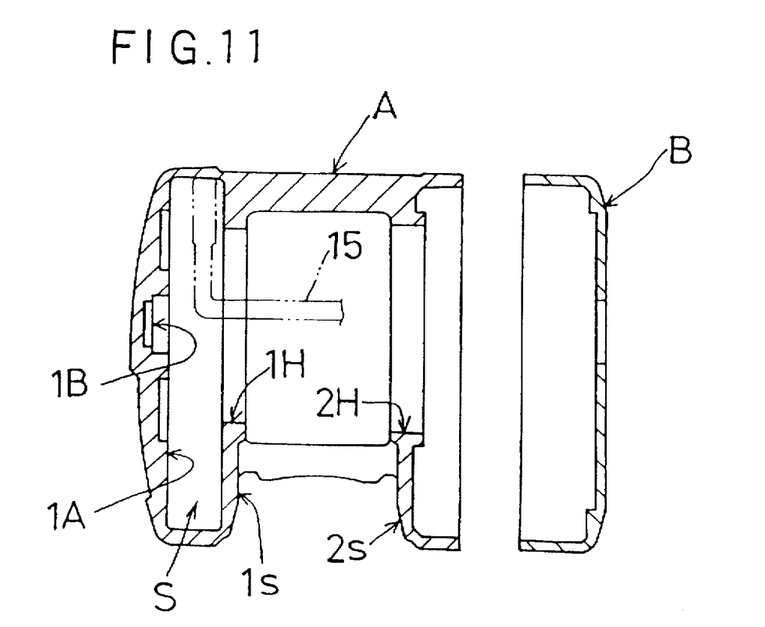
FIG. 11 is a sectional view of the integral unit after a cutting process.

As shown in FIG. 10, the integral unit A is formed by die casting. Further, as shown in FIG. 11, the left case 1 has a component mounting space S which is formed by boring with a cutting tool 15 inserted through spool inserting openings 1H and 2H.

To save as much time and trouble as possible in carrying out the boring process, an inside wall 1A of the outer wall is formed flat with no projection. A bearing receiving recess 1B has a depth about ¼ to ¾ of the thickness of the bearing. The case 1 is cut such that an outside surface and an inside surface define substantially concentric circles and define a relatively small wall thickness in a sectional view seen in the direction along the axis Q of the spool 6.

Further, inward surfaces (opposed to the spool) of walls 1S and 2S between which the level wind mechanism R is mounted, as well as inside peripheral surfaces of the openings 1H and 2H, are finished by cutting also.

Outside surfaces of the integral unit A and lid B are finished to form no difference in level, and treated with a bright alumite.

Figure 1:
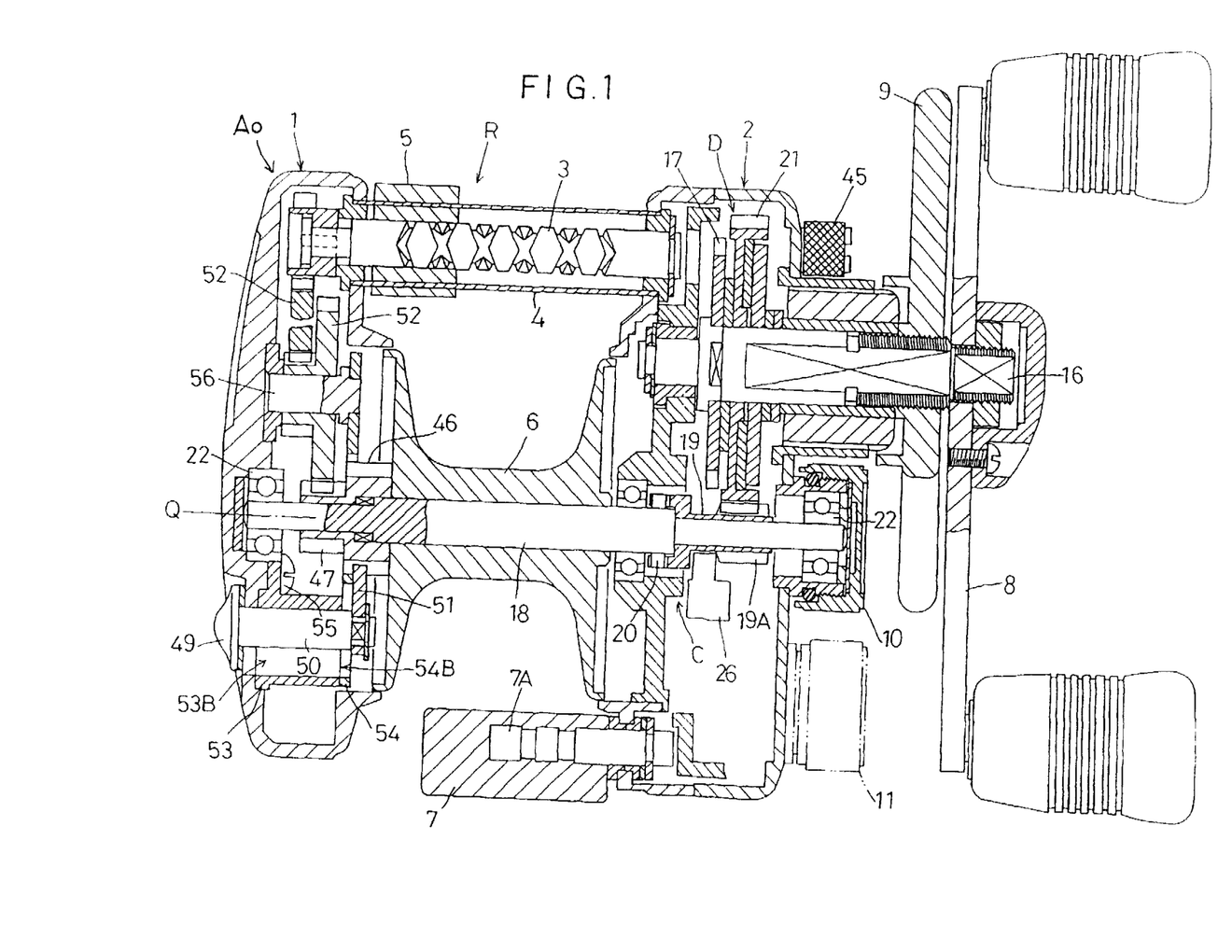
FIG. 1 is a plan view in cross section of a reel.
Figure 2:
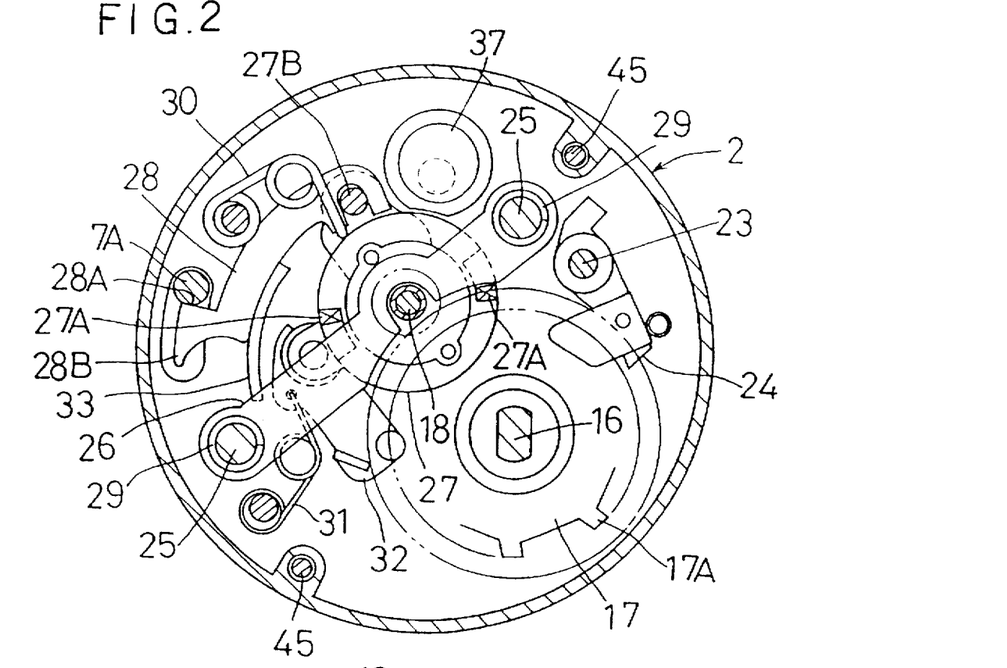
FIG. 2 is a side view of a clutch operating system.

As shown in FIGS. 1 and 2, the handle 8 and drag controller 9 are mounted on a handle shaft 16 extending from the right case 1. The handle shaft 16 supports a drag mechanism D and a ratchet wheel 17 mounted on an inward end portion thereof. A spool shaft 18 rotatable with the spool 6 supports a clutch sleeve 19 slidably mounted thereon and a pin 20 fixed to the spool shaft 18 to be engageable with the clutch sleeve 19. The clutch sleeve 19 and pin 20 constitute a clutch mechanism C. The clutch sleeve 19 has an input gear 19A meshed with an output gear of the drag mechanism D, whereby torque from the handle 8 is transmitted to the spool 6 through the drag mechanism D and clutch mechanism C.

The spool shaft 18 is supported at opposite ends thereof by bearings 22. The cast controller 10 is screwed to the right case 2 for adjusting a frictional force applied to the righthand end of the spool shaft 18. The ratchet wheel 17 has teeth 17A engageable with a pawl 24 pivotable on an axis 23 to prevent backward turning of the handle 8.

As shown in FIG. 2, the clutch sleeve 19 is engaged with a shifter 25 slidably supported on a pair of support shafts 25. A rotary cam 27 is rotatably mounted coaxially with the axis Q of the spool 6. This rotary cam 27 defines a pair of cam surfaces 27A for sliding the shifter 26. The rotary cam 27 has an engaging pin 27B engaged with a link element 28 operable through contact with a control pin 7A of the clutch controller 7.

Compression springs 29 are mounted on the support shafts 25 to urge the shifter 26 and clutch mechanism C to a clutch engaging position. A toggle spring 30 acts on the rotary cam 27 to maintain the rotary cam 27 in a position to engage or a position to disengage the clutch mechanism C. A further toggle spring 31 acts on a return arm 31 to switch the arm 31 to a position in which an end thereof interfere with the ratchet wheel 17 when the clutch mechanism C is set to the disengaged position. When disengaging the clutch mechanism C, the clutch controller 7 is depressed to place the link element 28 into contact with a guide 33. Then the link element 28 moves describing an arcuate locus while in contact with the guide 33, to rotate the rotary cam 27. As a result, the clutch mechanism C is disengaged through pressure contact with the cam surfaces 27A. When engaging the clutch mechanism C, the handle 8 is turned in a direction to take up the fishing line. This causes a tooth 17A of the ratchet wheel 17 to push the return arm 32, whereby the rotary cam 27 is returned. Consequently, the shifter 26 moves under the urging force of compression springs 29 to the position to engage the clutch mechanism C.

Figure 9:
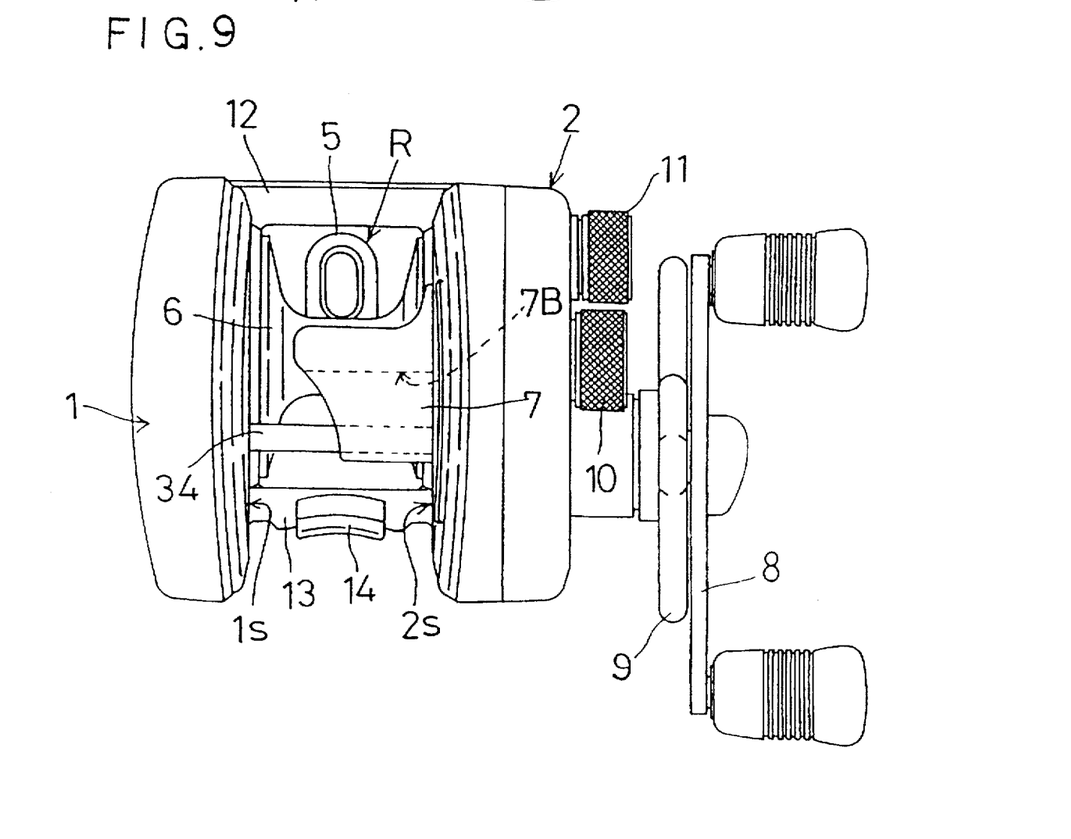
FIG. 9 is a rear view of the reel.

As shown in FIG. 9, the clutch controller 7 is supported to be slidable only relative to the wall 2S of the right case 2. The control pin 7A extends through an arcuate guide bore 2A so that the clutch controller 7 describes an arcuate locus about the center P of the reel body AO in side view. The clutch controller 7 defines an arcuate perforation 7B to receive a connecting frame 34 as shown in FIG. 3.

It is necessary, when assembling the reel, to insert the control pin 7A into the guide bore 2A in such a way that the pin 7A is correctly placed above an engaging portion 28A of the link element 28. To facilitate this operation, the link element 28 includes a restricting projection 28B formed at a lower end thereof to stop insertion of the pin 7A to a position below the link element 28.

Figure 4:
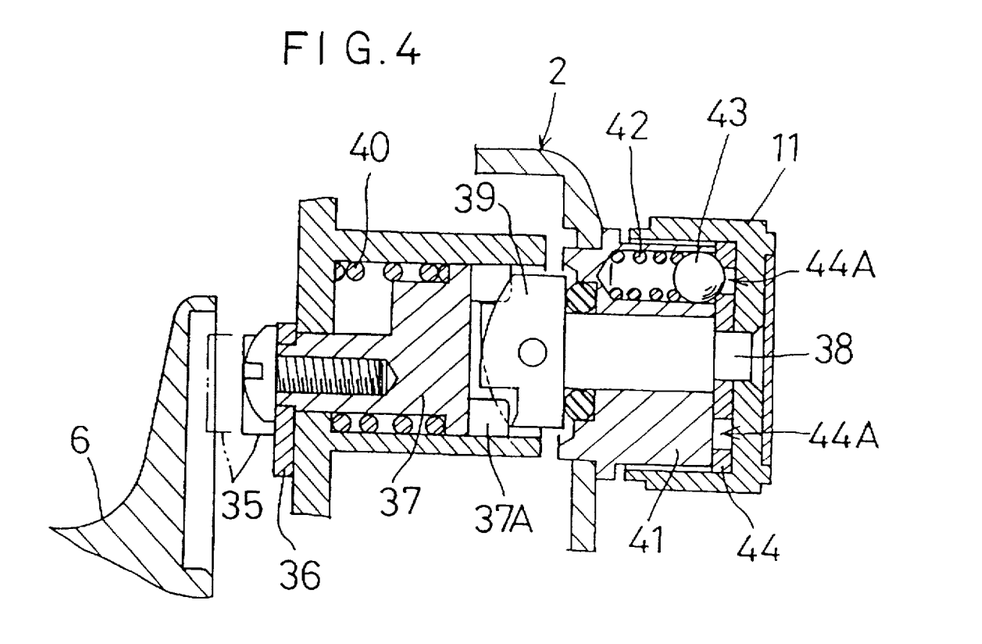
FIG. 4 is a sectional view of a brake control system.
Figure 5:
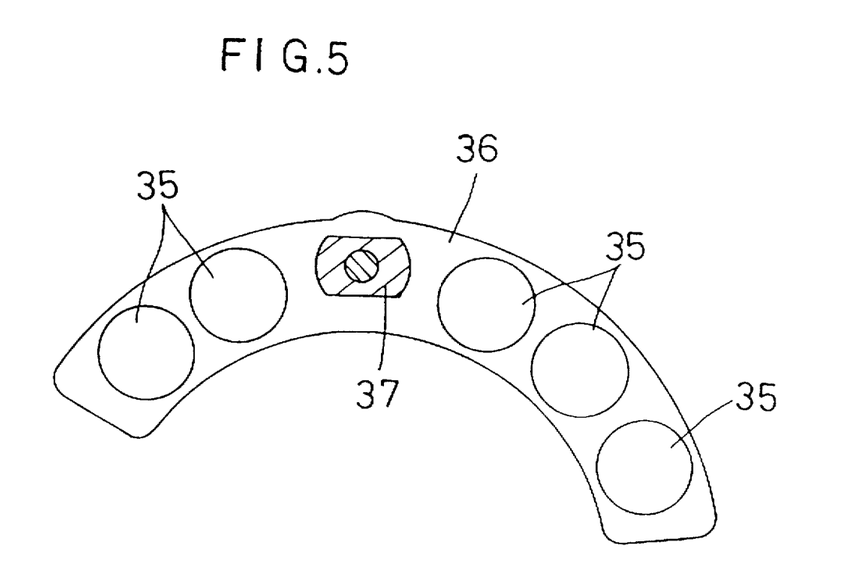
FIG. 5 is a side view of a brake plate.

As shown in FIGS. 4 and 5, the right case 2 has a magnet type brake mechanism mounted therein, whose braking force is adjustable by the brake controller 11. The brake mechanism includes a plate 36 disposed adjacent a side face of the spool 6 and having a plurality of magnets 35, a slide element 37 for supporting the plate 36 to be movable toward and away from the spool 6, a cam 39 connected to the brake controller 11 through a control shaft 38 for contacting a contact portion 37A of the slide element 37 to determine a position of the slide element 37, and a compression spring 40 acting as a resilient element for urging the slide element 37 away from the spool 6. A ball type detent mechanism is provided between the brake controller 11 and a support 41 secured to the reel bodes AO. This detent mechanism includes a compression spring 42, a ball 43 urged by the spring 42, and a plurality of bores 44A formed in a disk 44 rotatable with the brake controller 11. The ball 43 is selectively Engageable with the bores 44A to maintain the brake controller 11 in a control position.

With this brake mechanism, the closer the magnets 35 are to the side face of the spool 6, the greater eddy currents are generated at a casting time in the spool 6 formed of an aluminum alloy to produce the greater braking force.

The right case 2 may be opened by removing screws 45 (FIG. 1) and lid B.

Figure 6:
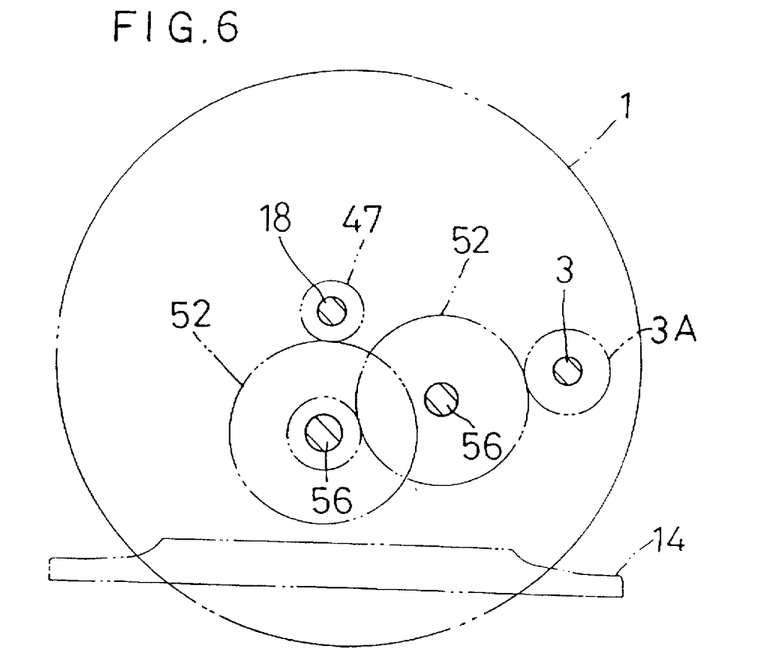
FIG. 6 is a side view of a transmission system for driving a level wind mechanism.
Figure 7:
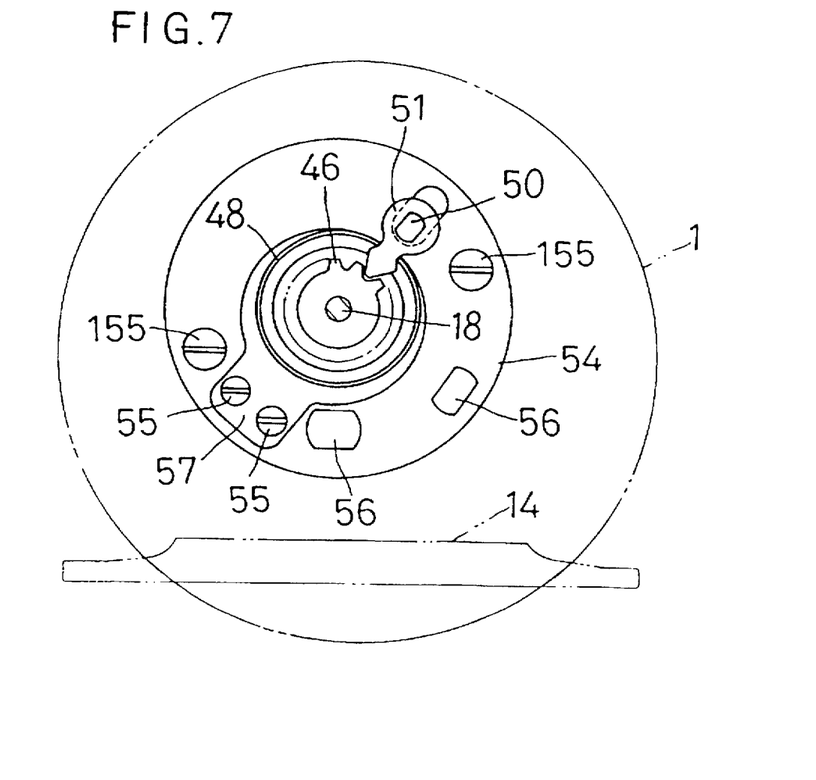
FIG. 7 is a side view of a clicking sound producing system.
Figure 8:
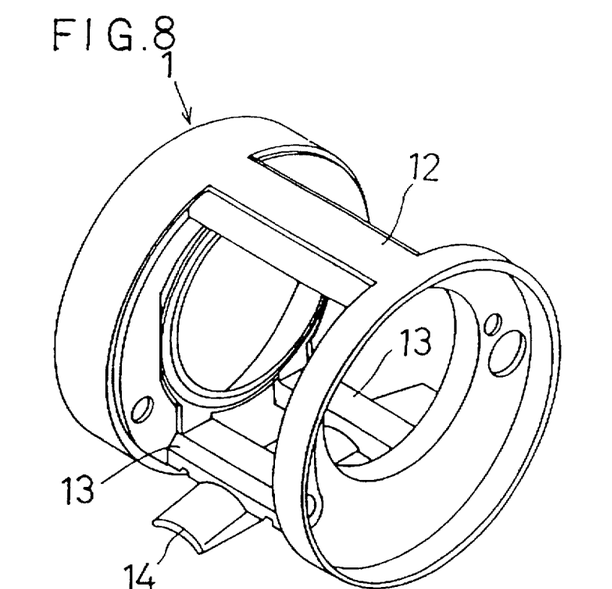
FIG. 8 is a sectional view of an integral unit.

As shown in FIGS. 1, 6 and 7, the spool shaft 18 carries, fixed to a left end region thereof extending into the left case 1, an element having a first gear 46 for producing a clicking sound and a second gear 47 for transmitting drive to the level wind mechanism R. A clicking piece 51 is disposed adjacent the first gear 46, which is urged by a ring spring 48 defining a slit and is movable by a control knob 49 and a control shaft 50 into and out of engagement with the first gear 46. Further, a transmission system is provided which includes first and second intermediate gears 52 for transmitting the drive from the second gear 47 to an input gear 3A mounted on the screw shaft 3. The transmission system and clicking system are mounted in the left case 1 and supported by two plates 53 and 54, respectively.

The outward plate is called herein a first plate 53 and the inward plate a second plate 54. The first plate 53 is fixed to the outer wall by a pair of screws 55 acting also as retainers for the bearing 22 supporting the spool shaft 18. The second plate 54 is fixed to projections of the first plate 53 by a pair of screws 155. The control shaft 50 extends through slots 53B and 54B defined in the first and second plates 53 and 54, respectively. The first and second intermediate gears 51 and 52 are supported on shafts 56 sandwiched between the first and second plates 53 and 54. The ring spring 48 is fixed to the second plate 54 through a bracket 57 by a pair of screws 55.

The present invention is applicable also to a reel having a D-shaped configuration in side view, with an outer part cut off.

Figure 12:
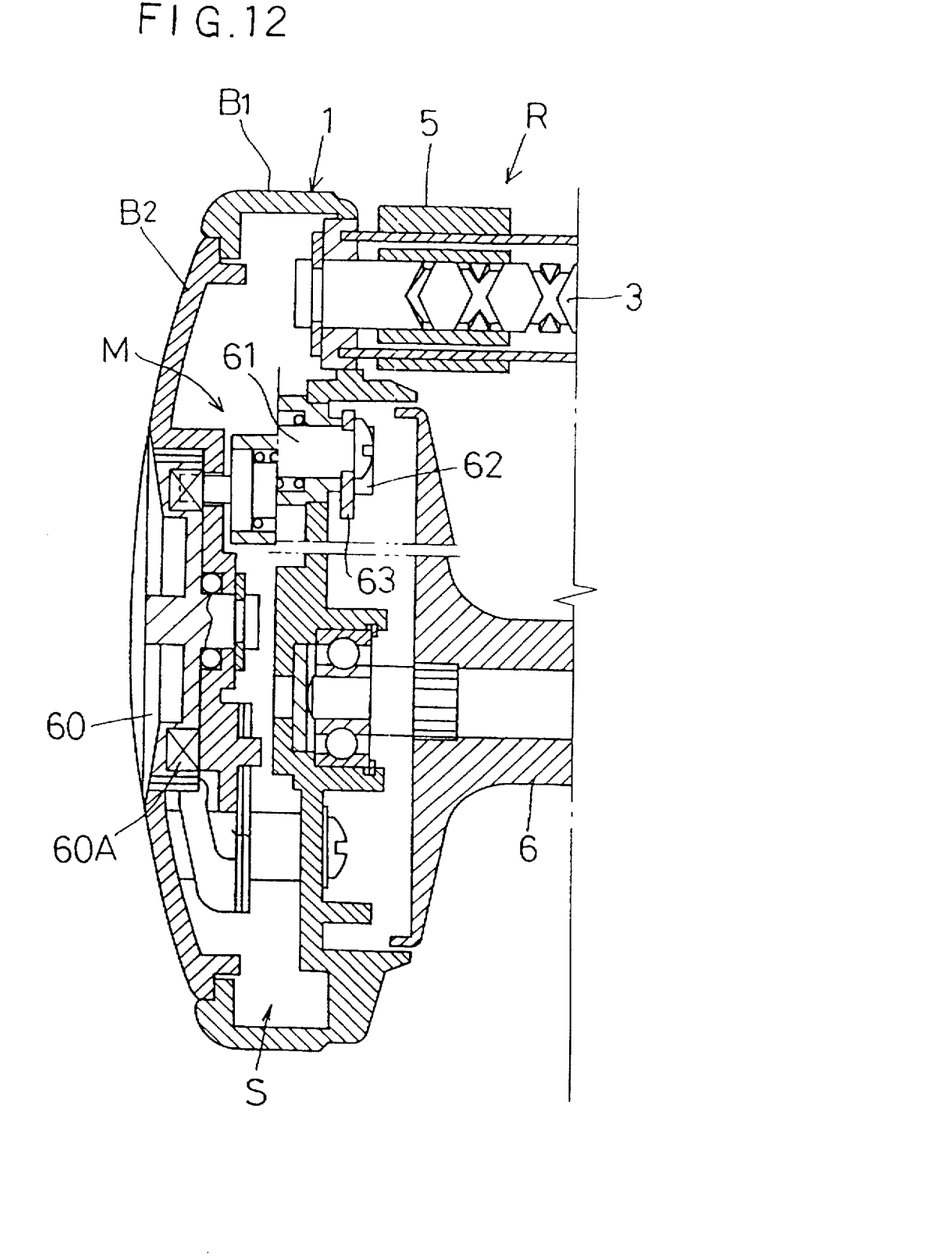
FIG. 12 is a sectional view of another embodiment of the invention.

Further, the present invention is applicable to a reel as shown in FIG. 12. This reel includes a left case 1 formed of part of an integral unit A and a lid B2 to be openable outwardly, and a magnet type brake mechanism M mounted in the left case 1. The brake mechanism M includes a turn knob 60 defining a cam 60A, a rod 61 extendible and retractable through contact with the cam 60A, and a plate 63 having magnets 62.

A level wind mechanism R of a reel in another embodiment of the present invention will be described next.

Figure 13:
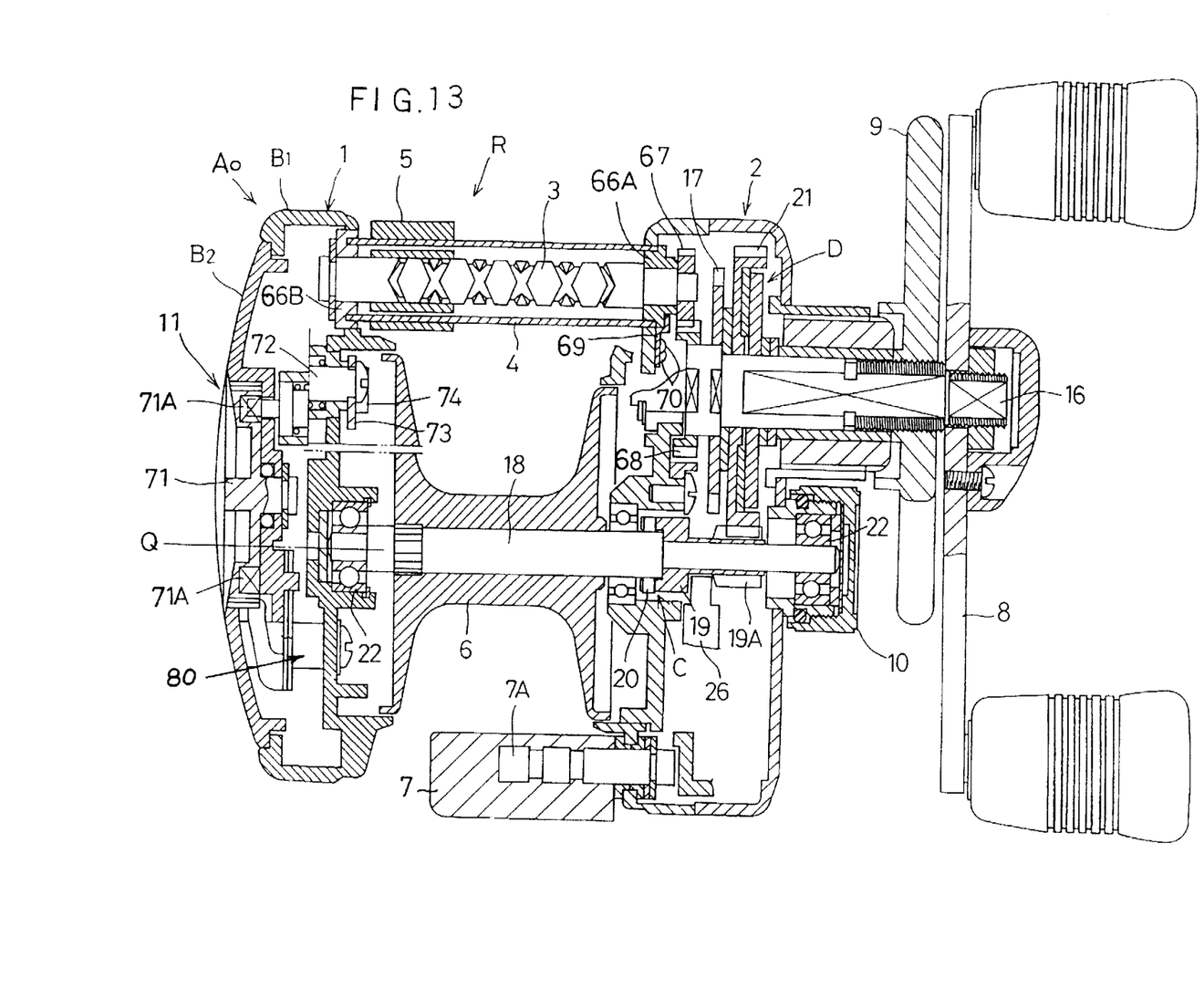
FIG. 13 is a sectional plan view of a reel in a further embodiment of the invention.

As shown in FIG. 13, a guide rod 4 is loosely fitted at one end thereof in a bearing bore defined in a left case 1, and at the other end in a bearing bore defined in a right case 2. Right and left bearings 66A and 66B are mounted in the opposite ends of the guide rod 4, and a screw shaft 3 extends between the two bearings 66A and 66B. An extreme end of the screw shaft 3 projecting from the right bearing 66A carries an input gear 67 acting as a rotary input element for receiving drive. The input gear 67 is interlocked with an output gear 68 mounted on a handle shaft 16 to drive the screw shaft 3. Screw 80 extends from the left case 1 to the lid B2.

Figure 14:
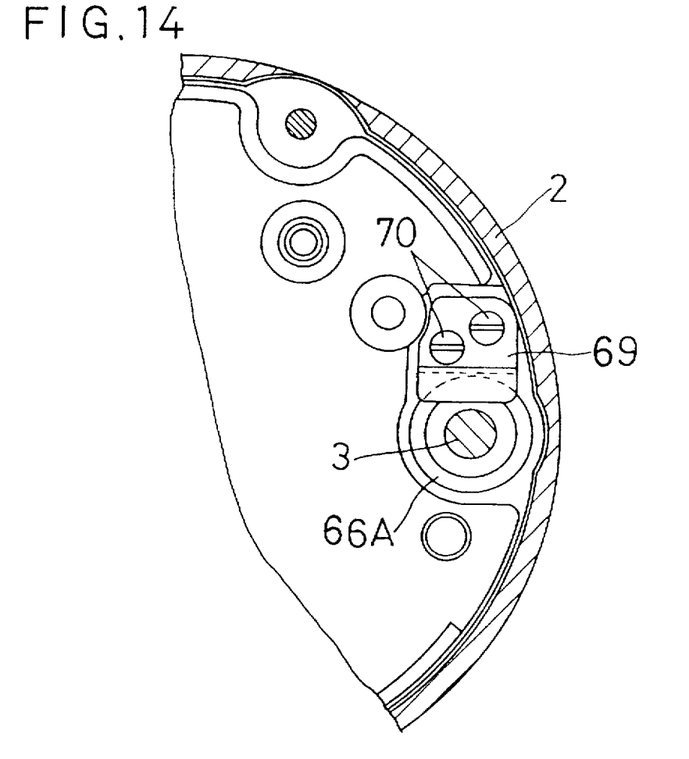
FIG. 14 is a side view of a screw shaft mounting structure in the reel shown in FIG. 13.

As shown in FIG. 14, the portion of the right bearing 66A projecting from the guide rod 4 into an interior space of the right case 2 has an approximately D-shaped section. A lower bent portion 69A of a clamp 69 is placed in engagement of a cutout position of the D-shaped section to restrict movement of the right bearing 66A axially of the screw shaft 3. The fastening plate 69 is secured to an inside wall of the right case 2 by two screws 70. The clamp 69 formed separately from the right bearing 66A has the function only to restrict the movement of the bearing 66A axially of the screw shaft 3.

As shown in FIG. 13, the left case 1 is formed of an integral unit B1 and a lid B2 to be openable. The left case 1 has a turn knob 71 mounted therein. A magnet type brake controller 11 is provided which includes a rod 72 extendible and retractable through contact with a cam 71A formed on the knob 71, and a plate 73 having magnets 74.

Since the bearing 66A is fitted in the reel body AO, the bearing 66A as integrated with the reel body AO bears a load acting on the screw shaft 3. The clamp 69 acts only to limit the movement of the bearing 66A axially of the screw shaft 3.

The above construction is capable of receiving, by means of the bearings, the load acting on the screw shaft, in addition to the, advantages of the foregoing embodiment. The clamp attached to the reel body performs only the function to limit the movement of the bearing axially of the screw shaft. Consequently, the clamp is not directly subjected to the load (or bending moment) acting on the screw shaft. This provides the advantage that the clamp may be attached to the reel body by means of simple parts such as bolts.

The foregoing embodiment may be modified as follows:

(a) The rotary input element 67 may be a pulley instead of a gear.

(b) The bearing 66A may be a rolling bearing or a slide bearing.

Figure 15:
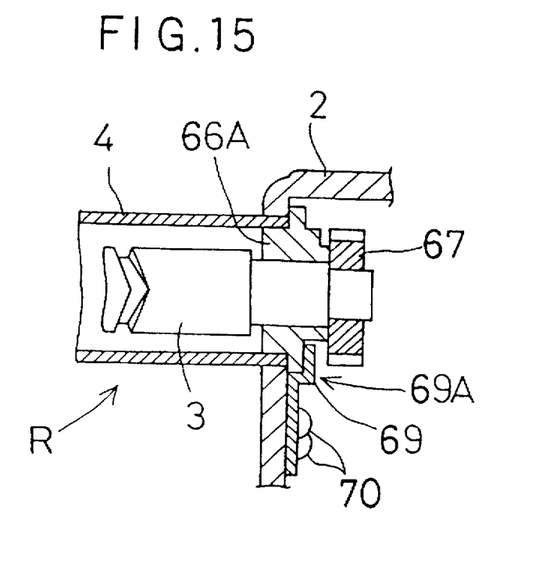
FIG. 15 is an enlarged sectional plan view showing the screw shaft mounting structure in the reel shown in FIG. 13.

(c) As shown in FIG. 15, the clamp 69 may be formed of an elastic material and cantilevered from the inside face of the right case 2. Then, the right bearing 66A is attachable and detachable utilizing elastic deformation of a free end of the clamp 69. The right bearing 66A mounted in position is retained there by an elastic pressing force imparted from the free end of the clamp 69.

(d) When bolting the lid B to the integral unit A, part of the bolts may be used as the clamp 69 to contact and retain the right bearing 66A. Alternatively, part of the lid B may be used to retain the right bearing 66A in position.

Like references are used to identify like components throughout the foregoing embodiments and modifications.

What is claimed is:

1. A baitcasting reel comprising:

a reel body having a circular configuration with an outer diameter of 45 to 70 mm and a center, said reel body including a first case, a second case, a lower frame, and a thumb rest, said reel body including a one-piece integral unit including at least a portion of said first case, at least a portion of said second case, said lower frame and said thumb rest;

a spool having an axis, said first case having a side face facing away from said spool, and said second case having a side face facing away from said spool;

a first lid portion overlapping with said spool viewed along said spool axis, said lid portion being attached to said side face of said first case by a screw, said screw attaching said first lid portion from inside of said first case such that said first lid portion has a smooth exterior surface, said screw extending from said first case to said first lid portion and having a screw head overlapping with said spool viewed along said spool axis; a handle and a handle shaft attached to said second case;

a second lid portion covering said side face of said second case;

said lower frame being located between said first and second cases and mounted inwardly of an outer peripheral portion of said reel body as viewed in a direction along said axis of said spool;

said thumb rest being located between said first and second cases at an outer periphery of said reel body and on an opposite side to said lower frame relative to said axis of said spool;

a mounting foot for connecting said reel body to a fishing rod, said mounting foot being connected to said lower frame, with a distance between said mounting foot and said center of said reel body as viewed in a direction along said axis of the spool being 40 mm or less;

a central plane of said reel body, which extends through said center of said circular configuration of said reel body and extends substantially parallel to said mounting foot, being located between said mounting foot and said axis of said spool;

a drive mechanism for transmitting drive from said handle shaft to said spool, said drive mechanism including a drag mechanism, an output gear and a clutch mechanism;

a level wind mechanism disposed between said first and second cases; and a clutch control member located between said first and second cases, said clutch control member and said level wind mechanism being located on opposite sides of said reel body.

2. A baitcasting reel as claimed in claim 1, wherein said thumb rest has an outer surface which is substantially level with the outer surfaces of said first and second cases.

3. A baitcasting reel as claimed in claim 1, wherein said integral one-piece unit is made of die-cast aluminum, said first lid portion and said integral one-piece unit are formed without forming a gap in the level therebetween.

4. A baitcasting reel as claimed in claim wherein said lid portions are treated with a bright alumite.

5. A baitcasting reel as claimed in claim 1, wherein said level wind mechanism includes a bearing, a rotatable screw shaft having one end thereof supported by said reel body, and the other carrying a rotatable input element and supported by said bearing, and clamp means attached to said reel body for contacting one end of said bearing to prevent movement of said bearing axially of said screw shaft.

6. A baitcasting reel as claimed in claim 5, wherein said screw shaft and said bearing are inserted into a through hole defined in said side face of said second case so as to be supported between said second case and said first case.

7. A baitcasting reel as claimed in claim 9, wherein said clamp means is formed of an elastic material and cantilevered from an inside face of a case, one of said bearings being attachable and detachable utilizing elastic deformation of a free end of said clamp, said one bearing being retained in position by an elastic pressing force imparted from the free end of said clamp.

8. A baitcasting reel as defined in claim 1, wherein one of said first and second cases contains a magnet type brake mechanism having a braking force adjustable by a brake controller.

9. A baitcasting reel as claimed in claim 8, wherein said second case contains said magnet type brake mechanism.

10. A baitcasting reel as claimed in claim 9, wherein said magnet type brake mechanism includes a plate disposed adjacent a side face of said spool and having a plurality of magnets, a slide element for supporting said plate to be movable toward and away from said spool, a cam connected to said brake controller through a control shaft for contacting a contact portion of said slide element to determine a position of said slide element, and a compression spring for urging said slide element away from said spool.

11. A baitcasting reel as claimed in claim 1, wherein said drive mechanism is located within one of said first and second cases, and wherein said drive mechanism is detachable from said reel body.

12. A baitcasting reel comprising:

a reel body having a circular configuration with an outer diameter of 45 to 70 mm and a center, said reel body including a first case, a second case, a lower frame, and a thumb rest, said reel body including a one-piece integral unit including at least a portion of said first case, at least a portion of said second case, said lower frame and said thumb rest;

a spool having an axis, said first case having a side face facing away from said spool, and said second case having a side face facing away from said spool;

a first lid portion overlapping with said spool viewed along said spool axis, said lid portion being attached to said side face of said first case by a screw, said screw attaching said first lid portion from inside of said first case such that said first lid portion has a smooth exterior surface, said screw extending from said first case to said first lid portion, said screw having a screw head contacting a surface of said first case on the side of said first case which faces said spool;

a handle and a handle shaft attached to said second case;

a second lid portion covering said side face of said second case;

said lower frame being located between said first and second cases and mounted inwardly of an outer peripheral portion of said reel body as viewed in a direction along said axis of said spool;

said thumb rest being located between said first and second cases at an outer periphery of said reel body and on an opposite side to said lower frame relative to said axis of said spool;

a mounting foot for connecting said reel body to a fishing rod, said mounting foot being connected to said lower frame, with a distance between said mounting foot and said center of said reel body as viewed in a direction along said axis of the spool being 40 mm or less;

a central plane of said reel body, which extends through said center of said circular configuration of said reel body and extends substantially parallel to said mounting foot, being located between said mounting foot and said axis of said spool;

a drive mechanism for transmitting drive from said handle shaft to said spool, said drive mechanism including a drag mechanism, an output gear and a clutch mechanism;

a level wind mechanism disposed between said first and second cases; and a clutch control member located between said first and second cases, said clutch control member and said level wind mechanism being located on opposite sides of said reel body.

13. A baitcasting reel comprising:

a reel body having a circular configuration with an outer diameter of 45 to 70 mm and a center, said reel body including a first case, a second case, a lower frame, and a thumb rest, said reel body including a one-piece integral unit including at least a portion of said first case, at least a portion of said second case, said lower frame and said thumb rest;

a spool having an axis, said first case having a side face facing away from said spool, and said second case having a side face facing away from said spool;

a first lid portion overlapping with said spool viewed along said spool axis, said lid portion being attached to said face of said first case by a screw, said first lid portion having a smooth exterior surface, and wherein said screw attaches said first lid portion from inside of said first case such that said screw does not protrude from said exterior surface of said first lid portion, said screw extending from said first case to said first lid portion and having a screw head overlapping with said spool viewed along said spool axis;

a handle and a handle shaft attached to said second case;

a second lid portion covering said side face of said second case;

said lower frame being located between said first and second cases and mounted inwardly of an outer peripheral portion of said reel body as viewed in a direction along said axis of said spool;

said thumb rest being located between said first and second cases at an outer periphery of said reel body and on an opposite side to said lower frame relative to said axis of said spool;

a mounting foot for connecting said reel body to a fishing rod, said mounting foot being connected to said lower frame, with a distance between said mounting foot and said center of said reel body as viewed in a direction along said axis of the spool being 40 mm or less;

a central plane of said reel body, which extends through said center of said circular configuration of said reel body and extends substantially parallel to said mounting foot, being located between said mounting foot and said axis of said spool;

a drive mechanism for transmitting drive from said handle shaft to said spool, said drive mechanism including a drag mechanism, an output gear and a clutch mechanism;

a level wind mechanism disposed between said first and second cases; and a clutch control member located between said first and second cases, said clutch control member and said level wind mechanism being located on opposite sides of said reel body.

* * * * *